United States Patent [19]

Iwama et al.

[11] 4,358,378
[45] Nov. 9, 1982

[54] SELECTIVE PERMEABLE MEMBRANES AND PROCESS FOR PREPARING THE SAME

[75] Inventors: Akio Iwama; Hiroshi Iwahori; Yoshitaka Kazuse, all of Ibaraki, Japan

[73] Assignee: Nitto Electric Industrial Co., Ltd., Osaka, Japan

[21] Appl. No.: 249,587

[22] Filed: Mar. 31, 1981

[30] Foreign Application Priority Data

Mar. 31, 1980 [JP] Japan ................................. 55-42682

[51] Int. Cl.$^3$ ......................... B01D 39/16; B05D 5/00
[52] U.S. Cl. .................................. 210/500.2; 264/41; 427/244; 427/246; 427/352; 427/353
[58] Field of Search .............. 427/244, 246, 352, 353; 210/500.2; 521/27, 64; 264/41

[56] References Cited

U.S. PATENT DOCUMENTS 4,240,914 12/1980 Iwama et al. .................... 210/500.2

Primary Examiner—Evan K. Lawrence
Attorney, Agent, or Firm—Sughrue, Mion, Zinn, Macpeak & Seas

[57] ABSTRACT

A selective permeable membrane and a process for preparing the membrane. The process comprises applying to a supporting substrate a membrane forming solution prepared by dissolving in an organic solvent a polyimide polymer comprising principally a repeating unit represented by the general formula (I):

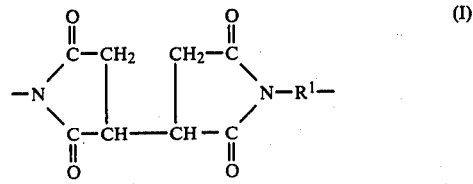

wherein $R^1$ represents a divalent organic group, and a liquid swelling agent having a coagulation value with respect to the polyimide polymer of about 50 to about 200 and a boiling point of about 50° C. to about 120° C. under atmospheric pressure, evaporating at least a part of the swelling agent, and coagulating the polyimide polymer by contacting the polyimide polymer with a coagulating solvent which does not dissolve the polyimide polymer but is compatible with the organic solvent and the swelling agent.

9 Claims, 1 Drawing Figure

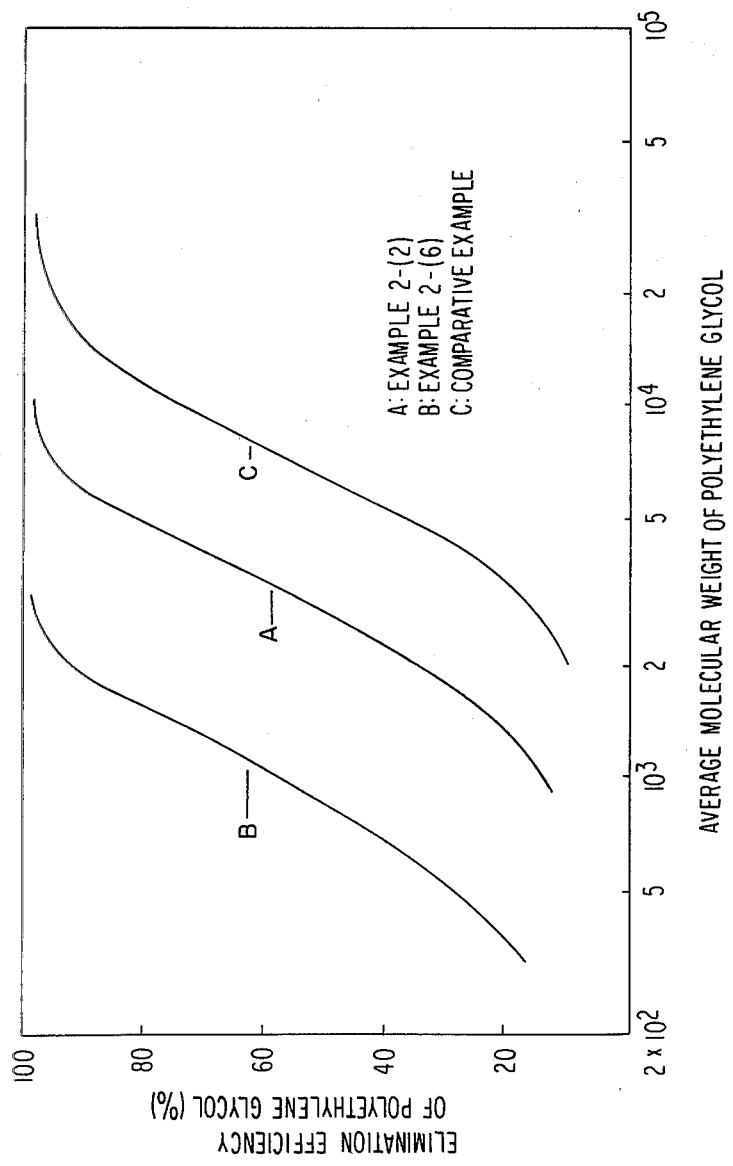

SELECTIVE PERMEABLE MEMBRANES AND PROCESS FOR PREPARING THE SAME

FIELD OF THE INVENTION

The present invention relates to a process for preparing selective permeable membranes and, particularly, to a process for preparing selective permeable polyimide membranes capable of being appropriately used for membrane separation treatment of not only aqueous liquid mixtures but also organic liquid mixtures.

BACKGROUND OF THE INVENTION

A membrane which is selectively permeable to specific components in a solution or a liquid mixture, such as an emulsion or a suspension, is generally called a selective permeable membrane. In the past, membrane separation treatment utilizing such a property has been carried out for only aqueous liquid mixtures. As is well known, permeable membranes composed of celluloses such as cellulose xanthate, cellulose acetate or cellulose nitrate, etc., as a starting material are not generally resistant to organic solvents, and permeable membranes prepared from synthetic resins such as polyvinyl chloride, polypropylene or polystyrene, etc., dissolve in organic solvents or are swelled by the organic solvents if they do not dissolve therein, as a result, they cannot be used as a permeable membrane.

However, membrane separation treatment must be capable of being used in treating not only aqueous liquid mixtures but also organic liquid mixtures and particularly organic solutions. Accordingly, development of selective permeable membranes for such purpose has been desired.

In order to satisfy this requirement, it has been already proposed to produce a selective permeable membrane composed of a polyimide prepared from 1,2,3,4-butanetetracarboxylic acid or derivatives thereof and diamine, as a starting material (e.g., as disclosed in U.S. Pat. No. 4,240,914, corresponding to Japanese Patent Application (OPI) 71785/79 (the term "OPI" as used herein refers to a "published unexamined Japanese patent application")). The present inventors have succeeded in developing a permeable membrane suitable for ultrafiltration of, particularly, organic liquid mixtures by using the above-described polyimide as a starting material, as disclosed in U.S. Patent Application Ser. No. 151,061, filed May 19, 1980, corresponding to Japanese Patent Application 61359/79. However, this ultrafiltration membrane does not separate very well solutes having a low molecular weight as low as 2,000 to 10,000, because the molecular weight cut off of the membrane is more than 20,000.

SUMMARY OF THE INVENTION

As a result of additional research, the present inventors have found that the above-described defect can be eliminated by using a swelling agent having a specific property with respect to a polyimide, and thus the present invention has been accomplished.

Accordingly, one object of the present invention is to provide a process for preparing selective permeable membranes.

A particularly important object is to provide a process for preparing a selective permeable membrane capable of being appropriately used for membrane separation treatment of not only aqueous liquid mixtures but also organic liquid mixtures and having a high elimination efficiency for solutes having a low molecular weight of about 2,000 to about 10,000 or so.

The process for preparing a selective permeable membrane according to the present invention comprises:

applying to a supporting substrate a membrane forming solution prepared by dissolving in an organic solvent a polyimide polymer comprising principally a repeating unit represented by the general formula (I)

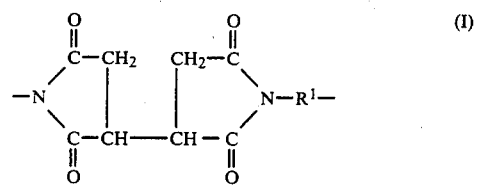

wherein $R^1$ represents a divalent organic group, and a liquid swelling agent having a coagulation value of about 50 to about 200 with respect to the polyimide polymer and a boiling point of about 50° to about 120° C. under atmospheric pressure, wherein the coagulation value of the swelling agent is defined as the minimum amount in ml of the swelling agent to be added to 50 ml of a 2% by weight solution of the polyimide polymer in N-methylpyrrolidone causing a white-turbidity by separation of the polymer at 25° C., evaporating at least a part of the swelling agent, and coagulating the polyimide polymer by contacting the polyimide polymer with a coagulating solvent which does not dissolve the polyimide polymer but is compatible with the organic solvent and the swelling agent to produce a membrane.

BRIEF DESCRIPTION OF THE DRAWING

The FIGURE shows the molecular weight gradation for polyethylene glycol of permeable membranes obtained in the Examples of the present invention and the Comparative Example given hereinafter.

DETAILED DESCRIPTION OF THE INVENTION

The polyimide polymer used in the present invention is obtained by reacting 1,2,3,4-butanetetracarboxylic acid or a derivative thereof with a diamine in an equimolar amount at about 100° to 300° C. for 10 to 50 hours using, preferably, a solvent (such as N-methylpyrrolidone, N-ethylpyrrolidone or sulfolane) to cause a dehydrocondensation, as described in the above-described U.S. Pat. No. 4,240,914, the disclosure of which is incorporated herein by reference. In the above-described general formula, the divalent organic group $R^1$ is preferably an aromatic, aliphatic or alicyclic hydrocarbon group or a hydrocarbon group comprising a combination thereof, or an organic group wherein the hydrocarbon groups are linked with a divalent bonding group, each group having up to 32 carbon atoms.

Suitable divalent aromatic hydrocarbon groups for $R^1$ are phenylene groups having 6 to 12 carbon atoms, specific examples of which include:

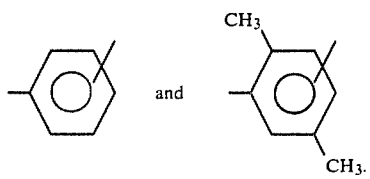

Suitable bonding groups X capable of forming a divalent organic group by linking with such aromatic hydrocarbon groups include, for example,

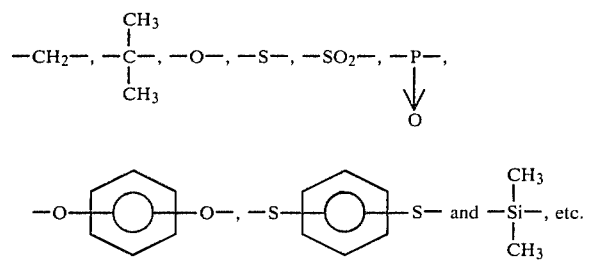

Suitable divalent aliphatic hydrocarbon groups for $R^1$ are straight or branched alkylene groups having 1 to 10 carbon atoms, specific examples of which include

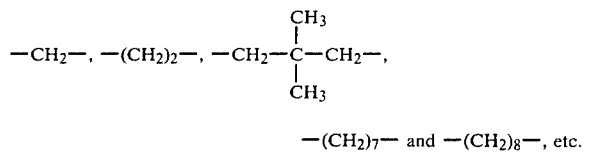

Further, suitable bonding groups Y capable of forming a divalent organic group by linking with the divalent aliphatic hydrocarbon groups include, for example, —O—, —S— and polyoxyalkylene groups, etc.

Suitable divalent alicyclic hydrocarbon groups for $R^1$ are cyclohexylene groups having 6 to 12 carbon atoms, specific examples of which include:

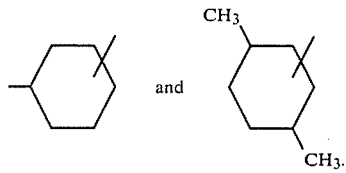

Further, these alicyclic hydrocarbon groups may form a divalent organic group $R^1$ by linking with the above-described bonding group X.

Of the above-described various divalent organic groups for $R^1$, particularly preferred groups in the present invention are aromatic hydrocarbon groups and groups wherein two aromatic hydrocarbon groups are linked with the bonding group X where X is —CH$_2$—, —C(CH$_3$)$_2$—, —O— or —SO$_2$—, for example,

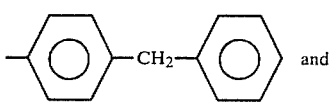

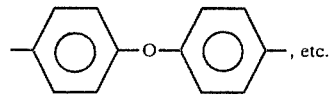

The polyimide polymer used in the present invention preferably is composed substantially of the above-described repeating unit, but the presence of some amide acid structure is permissible in the polyimide polymer. Namely, when the reaction of 1,2,3,4-butanetetracarboxylic acid with a diamine is carried out at a low temperature, a polymer containing an imide/amide acid structure which is an imide ring precursor, such as:

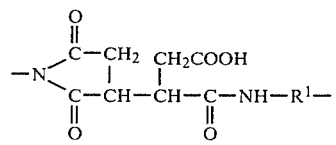

or

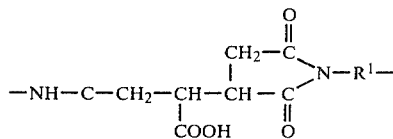

is permissible. In the present invention, it is possible to use a polyimide polymer having an imide conversion of about 70% or more where the imide conversion is defined as $$\frac{\text{Number of Imide Rings}}{\text{Number of Imide Rings} + \text{Number of Amide Bonds}}$$

However, the polyimide polymer preferably has an imide conversion of 90% or more and, particularly, 98 to 100%, namely, a polyimide consisting substantially of a repeating unit represented by the above-described general formula (I) is preferred for use. If the imide conversion is less than about 70%, the resulting permeable membrane has poor resistance to organic solvents.

The polyimide polymer used in the present invention has an inherent viscosity (measured at 30° C.) of, generally, about 0.55 to about 2.00, preferably 0.60 to 1.2. If the inherent viscosity of the polyimide polymer is too low, the polymer has a poor self-supporting properties, namely, poor film-forming properties, by which it is difficult to form an excellent selective permeable membrane. On the other hand, it is difficult to prepare a homogeneous liquor (referred to as "dope", hereinafter) for producing a film, by which it is difficult to form an excellent selective permeable membrane, if the inherent viscosity is too high. The polyimide polymer used in the present invention has generally an average molecular weight of about 20,000 to about 120,000, preferably 30,000 to 80,000.

The selective permeable membrane is prepared according to the process of the present invention as follows. Namely, the above-described polyimide polymer and a swelling agent, described hereinafter, are homogeneously dissolved in an organic solvent to prepare a dope. After the dope is applied to a suitable supporting substrate by flow coating or other coating methods using various apparatus, the swelling agent having a low boiling point is partially evaporated. Then, the polyimide polymer is coagulated by contacting the polyimide polymer with a coagulating solvent to form a membrane.

Importantly in the present invention a liquid organic compound having a low boiling point which has a specific property as a swelling agent for the polyimide polymer is used. More specifically, a liquid polar organic compound having a coagulation value with respect to the above-described polyimide polymer of about 50 to about 200 and a boiling point under atmospheric pressure of about 50° to about 120° C. is used as a swelling agent. The coagulation value is defined as the minimum amount in ml of the above-described swelling agent added to 50 ml of a 2% by weight solution of the above-described polyimide polymer in N-methylpyrrolidone causing a white-turbidity due to separation of the polymer at 25° C. Examples of suitable swelling agents which can be used include ethers such as tetrahydrofuran or dioxane; ketones such as acetone, methyl ethyl ketone, diethyl ketone or cyclohexanone; esters such as methyl formate, ethyl formate, methyl acetate or ethyl acetate; etc. It is of course necessary for the swelling agent to be compatible with both the organic solvent used for forming the dope (referred to as "dope solvent", hereinafter) and the coagulating solvent described hereinafter.

The amount of the swelling agent used depends upon the concentration of the polyimide polymer in the dope and the kind of dope solvent, and it is generally about 30 to about 300 parts by weight (all parts are by weight, herein unless otherwise indicated) and preferably 50 to 150 parts based on 100 parts of the polyimide polymer. If the amount of the swelling agent is too large, the homogeneity of the dope tends to deterioration. If the amount of the swelling agent is too small, there is a tendency to produce a selective permeable membrane which does not have a sufficient solvent permeating rate. These swelling agents are added, for example, in a suitable amount to a homogeneous solution previously prepared by dissolving the polyimide polymer in the dope solvent, and the resulting mixture is stirred at room temperature (e.g., about 15° to 35° C.), or, if necessary, with heating to about 50° to about 80° C. to prepare a homogeneous dope.

Suitable dope solvents include solvents which dissolve the polyimide polymer and the swelling agent and are compatible with the coagulating solvent, which is generally water. Specific examples of suitable dope solvents include N-alkyl-2-pyrrolidones such as N-methyl-2-pyrrolidone or N-ethyl-2-pyrrolidone; N-alkyl-2-piperidones such as N-methyl-2-piperidone; formamides such as dimethylformamide or diethylformamide; acetamides such as dimethylacetamide or diethylacetamide; dimethyl sulfoxide; tetramethyl urea; sulfolane; etc., and mixtures thereof. Generally, the dope solvent is selected so that it is a reaction solvent for the reaction of the butanetetracarboxylic acid with the diamine. After conclusion of the reaction, the reaction mixture, if necessary, is diluted or condensed, and the swelling agent is added thereto to prepare the dope. The concentration of the polyimide polymer in the dope is about 10 to 40% by weight (all % are by weight, herein, if not otherwise indicated) and preferably 15 to 30%. If too low a polyimide polymer concentration is used, the resulting permeable membrane exhibits poor selectivity. On the other hand, if the concentration of the polyimide polymer is too high, the dope is so viscous that homogeneous application thereof to the supporting substrate becomes difficult and the resulting permeable membrane is not practical because it has a low solvent permeating rate. Further, in connection with the concentration of the polyimide polymer, the dope viscosity at 30° C. is adjusted to about 50 to about 5,000 poises and preferably 100 to 2,000 poises at application to the supporting substrate. The minimum amount of the organic solvent in the dope is such that the homogeneous dope can be obtained, and is about 30 wt%, preferably 40 wt%. The maximum amount thereof is about 80 wt%. The dope solvent has a boiling point about 30° C. or more, preferably 80° to 200° C., higher than the boiling point of the swelling agent used.

In the present invention, after application of the dope to the supporting substrate, at least a part of the swelling agent is evaporated. At this time, part of the dope solvent may be evaporated at the same time. In this evaporating treatment, about 5 to about 30 wt%, preferably 10 to 20 wt%, of the dope coated is evaporated. This evaporating treatment is carried out at room temperature, e.g., about 15° to 35° C., for several seconds in short time evaporation or several tens of minutes in long time evaporation, e.g., about 1 to about 300 seconds though varying depending upon the desired evaporation amount. If necessary, the treatment may be carried out with heating to about 50° to about 100° C. This evaporating treatment is important for the permeable membrane in order to provide the elimination efficiency to solutes having a comparatively low molecular weight, e.g., about 2,000 to about 10,000. However, an evaporating treatment for too long time is not preferred from a practical standpoint because the permeating rate becomes remarkably low, although the elimination efficiency is improved.

In order to carry out the evaporating treatment, the supporting substrate is allowed to stand in an evaporating room maintaining the substrate horizontally in case that the dope is applied to the sheet supporting substrate. In case of a tubular supporting substrate, air or nitrogen is introduced at a fixed rate into the tube. It is preferred in this case for the supporting substrate to be rotated at a fixed rate in order to keep the dope at a definite thickness in the direction of the diameter of the tube.

After the evaporating treatment has been carried out, the supporting substrate is brought into contact with the coagulating solvent together with the dope applied thereto by, generally, immersion. The coagulating solvent for coagulating the dope applied to the supporting substrate is a solvent with good compatibility with the dope solvent, preferably capable of mixing therewith in an optional ratio, which dissolves the above-described swelling agent. A typical example of a coagulating solvent is water. Other examples of suitable coagulating solvents include mixtures of water and organic solvents miscible with water. Examples of the organic solvents which can be used for this purpose include acetone, aliphatic lower alcohols such as methanol, ethanol or propanol, etc., and glycols and derivatives thereof such as ethylene glycol, diethylene glycol or diethylene glycol monomethyl ether, etc. A suitable amount of these organic solvents in the solvent mixture is generally 10% by weight or less. If desired, these organic solvents may be used alone as the coagulating solvent.

The film formation can be carried out using conventional known processes. Namely, film formation can be carried out by applying the dope prepared by homogeneously dissolving the polyimide polymer and the swelling agent to the supporting substrate at room temperature range of about 15° to about 35° C. and immersing thereafter the coated supporting substrate in the coagulating solvent to substantially replace the dope solvent by the coagulating solvent, simultaneously coagulating the polyimide.

The supporting substrate used in this invention is not particularly limited. With a plate or a tube having a smooth surface composed of a material such as glass, stainless steel, aluminum, polyethylene or polypropylene, etc., is used as the supporting substrate, a sheet permeable membrane or a tubular permeable membrane can be obtained, because the polyimide polymer after coagulation in the coagulating solvent is easily released from the supporting substrate. Further, in the process of the present invention, it is possible to use, as the supporting substrate, a woven or nonwoven sheet or tube composed of synthetic resin fibers such as polyethylene fibers, polypropylene fibers, polyester fibers, acrylic fibers, polyamide fibers, polyacetal fibers, polyfluorovinylidene fibers, etc., or inorganic fibers such as glass fibers or carbon fibers, etc. When the dope is applied to such a supporting substrate by a suitable means such as roll coating, spraying, immersing or casting, etc., to make a membrane, it is possible to obtain a compound permeable membrane having a high strength wherein the supporting substrate is unified in a body with the membrane.

The thickness of the dope coated on the supporting substrate will vary depending on the use of the resulting selective permeable membrane or the kind of starting material thereof. The thickness is controlled such that the selective permeable membrane obtained generally has a thickness of about 50 to about 400μ, preferably about 100 to about 300μ. If the coating is too thin, the resulting permeable membrane has poor strength in use. If the coating is too thick, the selective permeability of the resulting permeable membrane is improved, but the permeable membrane is lacking in practical use because the solvent permeating rate becomes low.

In the present invention, the dope coated on the supporting substrate is contacted with the coagulating solvent immediately or, generally, within several tens of minutes, for example, within 30 minutes. An extremely long period of standing after application causes a white turbidity on the surface of the dope, and the transparency of the dope is destroyed. The permeable membrane formed from the white-turbid dope is not preferred, because uniform properties are not obtained throughout the membrane and the selective permeability is deteriorated.

The permeable membrane obtained by the process of the present invention which has a so-called skin layer with a dense structure on the surface thereof is a so-called anisotropic membrane wherein the skin layer is supported in a body by the porous under layer, which can be suitably used as an ultrafiltration membrane.

There is no particular limitation on the temperature at which the film formation is carried out by immersing the dope applied to the supporting substrate in the coagulating solvent, and it is generally lower than the boiling point of the coagulating solvent. Therefore, when water is used as the coagulating solvent, the temperature is generally in the range of about 0° (liquid state) to 80° C. and preferably in the range of 0° (liquid state) to 50° C. The time required for film formation by coagulation depends on the temperature used for coagulation, and it is generally about 1 to 10 hours. Further, the permeable membrane formed in the coagulating solvent as described above can be stored as it is in the coagulating solvent.

In the present invention, the permeable membrane can be stored in the conventional organic solvents. With a permeable membrane formed using water as the coagulating solvent, the storage of the membrane is carried out by immersing in a suitable organic solvent, for example, an aromatic hydrocarbon solvent after water in the membrane has been replaced by an organic solvent miscible with water such as acetone or methanol.

Further, in the present invention, for the purpose of improving the permeation rate of the resulting permeable membrane, chlorides, nitrates, sulfates or thiocyanates of alkali metals or alkaline earth metals or ammonium thiocyanate, etc., may be employed as additives to the dope and dissolved therein in an amount which does not damage homogeneity of the dope. Specific examples of such additives include lithium nitrate, potassium nitrate, potassium chloride, calcium nitrate, magnesium nitrate and sodium thiocyanate, etc. If desired, other metal salts, for example, zinc chloride, manganese chloride, tin chloride, iron chloride, aluminum nitrate, copper nitrate or iron nitrate, etc., and metal salts or ammonium salts of organic acids such as sodium acetate, potassium formate or sodium citrate, etc., are used, too. These additives should be soluble in the coagulating solvent, similar to situation with the above-described swelling agent.

These additives are preferably used in an amount of about 100 parts or less based on 100 parts of the polyimide polymer in the dope. In using the additives, it is preferred for the concentration of the polyimide polymer in the dope, the viscosity of the dope and the concentration of the swelling agent, etc., to be within the above-described ranges, respectively.

In the process of the present invention, for the purpose of improving the mechanical strength at high temperature of the resulting permeable membrane, the membrane may be subjected to heat treatment at about 100° to about 400° C. for about 5 to about 30 minutes after film formation. The heat treatment may be carried out using heated air or by immersing the membrane in hot water or hot ethylene glycol. If the heat treating temperature is high, the treating time decreases. If the heat treating temperature is low, the treating time increases. For example, a heat treating temperature of 100° C. requires a treatment for 20 to 25 minutes and a heat treating temperature of 350° C. requires a treatment for several seconds to several tens of seconds.

According to the present invention, as described above, a selective permeable membrane having a high elimination efficiency to solutes having a relatively low molecular weight of about 2,000 to about 10,000 or so can be obtained, when a swelling agent having a specific property is used as a component of the dope and the polyimide polymer in the dope is coagulated to form a membrane after evaporation of, preferably, at least a part of the swelling agent from the dope applied to the supporting substrate.

Further, the selective permeable membrane according to the process of the present invention, as described in the following examples, has remarkably excellent organic solvent resistance and has high permeation rate for solvents and excellent selective permeability. Accordingly, this selective permeable membrane is suitable for ultrafiltration of organic liquid mixtures, etc., and can be advantageously used for not only treatment of industrial organic wastes but also concentration or purification in the field of food, medicine, fermentation and brewing, etc.

For example, the permeable membrane obtained by the process of the present invention is suitable for treating organic liquid mixtures containing the following organic solvents. Namely, aromatic solvents such as benzene, toluene, xylene or nitrobenzene, etc., ether solvents such as ethyl ether, tetrahydrofuran or dioxane, etc., ketone solvents such as acetone or methyl ethyl ketone, etc., monohydric alcohol solvents such as methanol, ethanol, propanol or butanol, etc., polyhydric alcohol solvents such as ethylene glycol, diethylene glycol or 1,3-butylene glycol, etc., polyhydric alcohol ether solvents such as methyl Cellosolve, ethyl Cellosolve, diethylene glycol monomethyl ether, ethylene glycol dimethyl ether or diethylene glycol dimethyl ether, etc., ester solvents such as ethyl acetate, butyl acetate, ethyl propionate, ethylene glycol mono- and diacetates or diethylene glycol mono- and diacetates, etc., and halogenated hydrocarbon solvents such as dichloromethane, 1,2-dichloroethane, trichlene, chloroform, bromoform or chlorobenzene, etc.

It is of course clear that the selective permeable membrane obtained by the process of the present invention can be suitably used for membrane separation treatment of aqueous liquid mixtures.

Reference examples for producing the polyimide polymer used in the process of the present invention and suitable non-limiting examples of the process of the present invention are described below.

REFERENCE EXAMPLE 1

Preparation of Polyimide Polymer

A 20 liter reactor equipped with a stirrer, an inlet for nitrogen gas, a reflux column equipped with a device for draining water of reaction and a water jacket capable of heating to 250° C. was charged with 14.8 kg of N-methyl-2-pyrrolidone (referred to as NMP, hereinafter), 2.81 kg of 1,2,3,4-butanetetracarboxylic acid and 2.40 kg of 4,4'-diaminodiphenyl ether, and the mixture was homogeneously dissolved by heating to about 70° C.

To the resulting solution, 1.7 kg of xylene as an azeotropic solvent was added, and the solution was heated to 175°-195° C. under nitrogen flow. While refluxing xylene, the water of reaction was distilled off by azeotropic distillation and continuously drained off.

As the reaction proceeded, the viscosity of the system increased with the result that 860 g of water was distilled off in about 35 hours. After conclusion of the reaction, xylene as the azeotropic solvent was distilled from the system to finally obtain a solution of a polyimide polymer in NMP having a solid content of 28% and a viscosity of 350 poises (measured with a B-type viscometer at 30° C.). This polyimide polymer had an inherent viscosity ($\eta$) of 0.70 at 30° C.

Nuclear magnetic resonance spectra and infrared spectra confirmed that the degree of imide conversion in this polyimide polymer was 99% or more.

REFERENCE EXAMPLE 2

Preparation of Polyimide Polymer

A solution of a polyimide polymer in NMP having a solid content of 18% and a viscosity of 57 poises (measured with a B-type viscometer at 30° C.) was obtained using the same procedures as in Reference Example 1 but using 1.50 kg of 1,2,3,4-butanetetracarboxylic acid, 1.27 kg of diaminodiphenylmethane and 12.8 kg of NMP.

This polyimide polymer had an inherent viscosity ($\eta$) of 0.58 at 30° C. Further, nuclear magnetic resonance spectra and infrared spectra confirmed that the degree of imide conversion was 99% or more.

EXAMPLE 1

Preparation of Dope

Dopes having the composition shown in Table 1 below were prepared using the solutions of the polyimide polymers in NMP obtained in Reference Examples 1 and 2.

TABLE 1

| Dope | Polyimide Polymer Reference Example No. | % by Weight | Swelling Agent | Part by Weight* | Coagulation Value |
|------|------|------|------|------|------|
| A | 1 | 26 | Acetone | 119 | 63.4 |
| B | 2 | 16.5 | Ethyl Formate | 50 | 92.8 |
| C | 1 | 20 | Acetone | 100 | 63.4 |
|   |   |   | Lithium Nitrate | 40 | — |
| D | 1 | 22 | Tetrahydrofuran | 150 | 87.7 |
| E | 1 | 22 | Dioxane | 180 | 172 |
| F | 1 | 30 | Acetone | 65 | 63.4 |
| G | 2 | 17 | Cyclohexanone | 80 | 174 |

*Based on 100 parts by weight of polyimide polymer.

EXAMPLE 2

Preparation of Membrane and Evaluation of Properties of Membrane

In the following, the properties of the membrane were evaluated by the elimination efficiency and the permeation rate defined by the following formulas using a solution of polyethylene glycol having an average molecular weight of 2,000 or 6,000 in ethanol which had a concentration of 5,000 ppm as a feed solution. The concentration of polyethylene glycol in the feed solution and that in the permeation solution were quantitatively measured by gel permeation chromatography.

Elimination Efficiency =

$$1 - \frac{\text{Concentration of Polyethylene Glycol in Permeation Solution}}{\text{Concentration of Polyethylene Glycol in Feed Solution}} \times 100 \, (\%)$$

Permeating Rate =

-continued $$\frac{\text{Permeation Volume of Ethanol (m}^3\text{)}}{\text{Effective Area of Membrane (cm}^2\text{)} \times \text{Permeating Time (day)}}$$

(1) A glass plate was coated with Dope A as shown in Table 1 to a thickness of 340μ. After standing in a horizontal position at 25° C. for about 10 seconds, the glass plate was immersed in water at 0° C. for 5 hours to obtain a permeable membrane having a thickness of 215μ. The resulting permeable membrane was immersed in methanol for 24 hours to replace the water, and it was stored in toluene until it was used.

The permeable membrane was removed from toluene and mounted in a pressure batch type measurement cell. The cell was supplied with the above-described solution of polyethylene glycol having a molecular weight of 6,000 at 25° C. under 5 kg/cm² to measure the elimination efficiency and the ethanol permeation rate. The results obtained are set forth in Table 2 below.

(2) The inner surface of a glass tube having an inner diameter of 13.6 mm and a wall thickness of 3 mm was flow coated with Dope A to a thickness of 320μ. The glass tube was then supported horizontally and rotated at 30 rpm. The evaporating treatment was carried out by passing air (25° C.) onto the tube at a flow rate of 50 l/minute (calculated at 0° C. at 1 atmosphere pressure) from an end of the tube for 30 seconds and then from the other end for an additional 30 seconds. After this treatment, the glass tube was immediately immersed in water at 5° C. for 5 minutes to obtain a tubular permeable membrane having an outer diameter of 13.3 mm and a thickness of 212μ. This tubular permeable membrane was immersed in methanol for 24 hours to remove water and thereafter stored in toluene.

After the resulting permeable membrane was inserted in a perforated stainless steel tube having an inner diameter of 13.4 mm, the tube was supplied with an aqueous solution of the above-described polyethylene glycol having a molecular weight of 6,000 at 25° C. under 5 kg/cm² to measure the elimination efficiency and the permeation rate. The results obtained are shown in Table 2 below.

(3) A glass plate was coated with Dope B to a thickness of 340μ, and the evaporating treatment was carried out in an air bath at 50° C. for 3 seconds. After the treatment, the glass plate was immediately immersed in water at 0° C. for 5 hours to obtain a permeable membrane having a thickness of 183μ. The resulting permeable membrane was immersed in methanol for 24 hours to remove water and, thereafter, stored in toluene.

The elimination efficiency and the permeation rate of the resulting permeable membrane measured in the same manner as in (1) are shown in Table 2 below.

(4) A glass plate was coated with Dope C to a thickness of 340μ. After standing in a horizontal position at 25° C. for about 10 seconds, the glass plate was immersed in water at 0° C. for 5 hours to obtain a permeable membrane having a thickness of 224μ. The resulting membrane was immersed in methanol to remove water and, thereafter, stored in toluene.

The properties of the resulting permeable membrane evaluated in the same manner in (1) are shown in Table 2 below.

(5) A glass plate was coated with Dope F to a thickness of 300μ. After standing in a horizontal position at 25° C. for about 30 seconds, the glass plate was immersed in water at 0° C. for 5 hours to obtain a permeable membrane having a thickness of 187μ. After it was immersed in methanol for 24 hours to remove water, it was stored in toluene.

The permeable membrane was removed from the toluene and was mounted in a pressure batch type measurement cell. The cell was supplied with the above-described solution of polyethylene glycol having a molecular weight of 2,000 in ethanol at 25° C. under 7 kg/cm² to measure the elimination efficiency and the ethanol permeation rate. The results obtained are shown in Table 2 below.

(6) The inner surface of a glass tube having an inner diameter of 13.6 mm and a wall thickness of 3 mm was coated with Dope F to a thickness of 300μ. The glass tube was then supported horizontally and rotating at 20 rpm. The evaporating treatment was carried out by passing air (25° C.) onto the tube at a flow rate of 50 l/minute (calculated at 0° C. under 1 atmosphere pressure) from an end of the tube for 30 seconds and then from the other end for 30 seconds. After the evaporating treatment, the glass tube was immediately immersed in water at 5° C. for 5 hours to obtain a tubular permeable membrane having a thickness of 205μ. This membrane was immersed in methanol to remove water and, thereafter, stored in toluene.

After the resulting permeable membrane was inserted in a perforated stainless steel tube having an inner diameter of 13.4 mm, the tube was supplied with the above-described solution of polyethylene glycol having a molecular weight of 2,000 at 25° C. under 7 kg/cm² to measure the elimination efficiency and the permeation rate. The results obtained are shown in Table 2 below.

(7) Membranes were produced using Dopes D, E and F using the same procedure as described above. The properties of the membranes are shown in Table 2 below.

Then, the molecular weight gradation for polyethylene glycol of the tubular permeable membrane obtained in Example 2-(2) and that of the tubular permeable membrane obtained in Example 2-(6) are shown in the FIGURE (measurement conditions: 25° C., 5 kg/cm²). It can be seen from the FIGURE that the former has a molecular weight separation ability in the region of a molecular weight of 6,000 and the latter had a molecular weight separation ability in the region of a molecular weight of 2,000.

COMPARATIVE EXAMPLE

A dope having a polymer content of 18% and containing 150 parts of diethylene glycol (coagulation value: 19.4) based on 100 parts of the polymer was prepared using a solution of a polyimide polymer obtained as described in Reference Example 1. The inner surface of a glass tube having an inside diameter of 13.6 mm and a thickness of 3 mm was coated with the resulting dope and immersed immediately in water at 5° C. for 5 hours to obtain a tubular permeable membrane having a thickness of 250μ. This permeable membrane was immersed in methanol for 24 hours to remove water and, thereafter, stored in toluene. After the permeable membrane was inserted in a perforated stainless steel tube having an inner diameter of 13.3 mm, the tube was supplied with a solution of polyethylene glycol having a molecular weight of 6,000 of a concentration of 5,000 ppm, at 25° C. under 5 kg/cm² to measure the elimination efficiency and the permeation rate. The results obtained are shown in Table 2 below.

Further, the molecular weight separation ability for polyethylene glycol of this tubular permeable membrane was about 20,000 as shown in the FIGURE showing also the permeable membranes according to the process of the present invention.

TABLE 2

| Example | Dope | Swelling Agent | Membrane Preparation Process Example No. | Thickness of Membrane ($\mu$) |
|---|---|---|---|---|
| 2 - (1) | A | Acetone | — | 215 |
| 2 - (2) | A | Acetone | — | 212 |
| 2 - (3) | B | Ethyl Formate | — | 163 |
| 2 - (4) | C | Acetone | — | 224 |
| 2 - (5) | F | Acetone | — | 187 |
| 2 - (6) | F | Acetone | — | 205 |
| 2 - (7) | D | Tetrahydrofuran | 2 - (1) | 208 |
| 2 - (8) | E | Dioxane | 2 - (2) | 211 |
| 2 - (9) | G | Cyclohexane | 2 - (1) | 181 |
| Comparative Example | — | (Diethylene Glycol) | — | 250 |

| Example | Permeation Rate ($m^3/m^2 \cdot day$) | Polyethylene Glycol Elimination Efficiency Molecular Weight: 2,000 | Polyethylene Glycol Elimination Efficiency Molecular Weight: 6,000 |
|---|---|---|---|
| 2 - (1) | 0.99 | — | 94.9 |
| 2 - (2) | 1.08 | — | 95.5 |
| 2 - (3) | 0.62 | — | 86.3 |
| 2 - (4) | 2.73 | — | 78.8 |
| 2 - (5) | 0.46 | 91.5 | — |
| 2 - (6) | 0.53 | 92.8 | — |
| 2 - (7) | 0.91 | — | 93.1 |
| 2 - (8) | 1.25 | — | 90.8 |
| 2 - (9) | 1.35 | — | 85.7 |
| Comparative Example | 2.55 | — | — |

EXAMPLE 3

Evaluation of Organic Solvent Resistance

A permeable membrane having a thickness of 245$\mu$ obtained as described in Example 2-(1) was immersed in various solvents at 25° C. for 48 hours, and the properties of the membrane were evaluated in the same manner as in Example 2-(1). The results obtained are shown in Table 3 below.

TABLE 3

| Organic Solvent for Immersion | Elimination Efficiency (%) | Permeation Rate ($m^3/m^2 \cdot day$) |
|---|---|---|
| Ethanol | 94.6 | 0.98 |
| Butyl Acetate | 92.8 | 0.91 |
| Methyl Ethyl Ketone | 97.0 | 0.92 |
| n-Hexane | 95.1 | 0.73 |
| Toluene | 96.3 | 0.89 |
| Trichloroethylene | 93.8 | 0.95 |
| Methyl Cellosolve | 93.2 | 0.86 |
| Dioxane | 88.7 | 0.95 |

As can be seen from the above results, the permeable membranes according to the present invention maintain their properties even if they are immersed in various organic solvents for a long period of time.

While the invention has been described in detail and with reference to specific embodiments thereof, it will be apparent to one skilled in the art that various changes and modifications can be made therein without departing from the spirit and scope thereof.

What is claimed is:

1. A process for preparing a selective permeable membrane which comprises:
applying to a supporting substrate a membrane solution prepared by dissolving in an organic solvent a polyimide polymer comprising principally a repeating unit represented by the general formula (I):

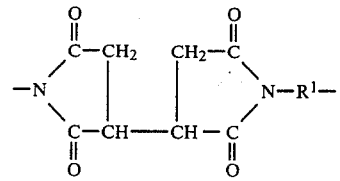

wherein $R^1$ represents a divalent organic group, and a liquid swelling agent having a coagulation value with respect to said polyimide polymer of about 50 to about 200 and a boiling point of about 50° C. to about 120° C. under atmospheric pressure, wherein the coagulation value of the swelling agent is defined as the minimum amount in ml of the swelling agent added to 50 ml of a 2% by weight solution of said polyimide polymer of N-methylpyrrolidone causing white-turbidity due to separation of the polyimide polymer at 25° C., evaporating at least a part of said swelling agent, and coagulating said polyimide polymer by contacting the polyimide polymer with a coagulating solvent which does not dissolve said polyimide polymer but is compatible with said organic solvent and said swelling agent, wherein the membrane forming solution comprises about 10 to about 40% by weight of said polyimide polymer and about 30 to about 300 parts by weight of said swelling agent based on 100 parts by weight of said polymer in an organic solvent.

2. The process for preparing a selective permeable membrane according to claim 1, wherein the polyimide polymer is a polyimide/polyamide acid having an imide conversion of at least about 70%.

3. The process for preparing a selective permeable membrane according to claim 1, wherein the polyimide polymer is a polyimide consisting substantially of a repeating unit represented by said general formula (I).

4. The process for preparing a selective permeable membrane according to claim 1, 2 or 3, wherein $R^1$ in said general formula (I) is a divalent organic group containing an aromatic ring.

5. The process for preparing a selective permeable membrane according to any of claim 1, 2 or 3, wherein said polyimide polymer has an inherent viscosity of about 0.55 to about 2.00.

6. The process for preparing a selective permeable membrane according to claim 1, 2 or 3, wherein the swelling agent is at least one liquid polar organic compound selected from the group consisting of tetrahydrofuran, dioxane, acetone, methyl ethyl ketone, diethyl ketone, cyclohexanone, methyl formate and ethyl formate.

7. The process for preparing a selective permeable membrane according to claim 1, 2 or 3, wherein the organic solvent is N-methylpyrrolidone and/or dimethylformamide and the coagulating solvent is water.

8. The process for preparing a selective permeable membrane according to claim 1, 2 or 3, wherein $R_1$ in said general formula (I) is:
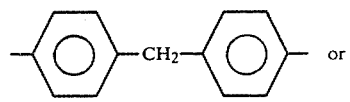 or
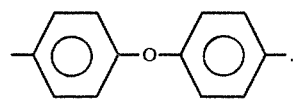.
9. A selective permeable membrane produced according to claim 1.
* * * * *